United States Patent
Koudo et al.

(10) Patent No.: US 10,620,733 B2
(45) Date of Patent: Apr. 14, 2020

(54) TOUCH PANEL AND DISPLAY DEVICE WITH THE SAME

(71) Applicant: Panasonic Liquid Crystal Display Co., Ltd., Himeji-shi, Hyogo (JP)

(72) Inventors: Toshikazu Koudo, Hyogo (JP); Ken Shiiba, Kanagawa (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 16/126,687

(22) Filed: Sep. 10, 2018

(65) Prior Publication Data

US 2019/0004657 A1    Jan. 3, 2019

Related U.S. Application Data

(63) Continuation of application No. PCT/JP2017/004401, filed on Feb. 7, 2017.

(30) Foreign Application Priority Data

Mar. 10, 2016   (JP) .................. 2016-046640

(51) Int. Cl.
*G06F 3/041* (2006.01)
*G06F 3/044* (2006.01)
*G06F 3/047* (2006.01)

(52) U.S. Cl.
CPC .......... *G06F 3/0412* (2013.01); *G06F 3/044* (2013.01); *G06F 3/047* (2013.01); *G06F 3/0416* (2013.01); *G06F 2203/04112* (2013.01)

(58) Field of Classification Search
CPC .......... G09F 3/041; G09F 3/045; G01R 27/26
See application file for complete search history.

(56) References Cited

U.S. PATENT DOCUMENTS

| 2011/0102370 A1 | 5/2011 | Kono et al. | |
| 2012/0169655 A1* | 7/2012 | Chang | G06F 3/0418 345/174 |
| 2015/0227233 A1* | 8/2015 | Yi | G06F 3/044 345/174 |

(Continued)

FOREIGN PATENT DOCUMENTS

| JP | 2010-262529 | 11/2010 |
| JP | 2012-208749 | 10/2012 |

(Continued)

*Primary Examiner* — Pegeman Karimi
(74) *Attorney, Agent, or Firm* — Hamre, Schumann, Mueller & Larson, P.C.

(57) ABSTRACT

A touch panel comprising first electrodes that extend in a first direction and second electrodes that extend in the second direction, wherein each of the first electrodes and each of the second electrodes are constructed with conductive wires having mesh shape, each of the first electrodes is formed such that wide portions and narrow portions, each of the narrow portions having a width that is a length in the second direction narrower than each of the wide portions, are alternately arranged in the first direction, and one wide portion and one narrow portion in an endmost first electrode formed at an end are narrower than one wide portion and one narrow portion in an inner first electrode located inside the endmost first electrode, respectively.

14 Claims, 18 Drawing Sheets

(56) References Cited

U.S. PATENT DOCUMENTS

2016/0147375 A1* 5/2016 Bok ................ G06F 3/0421
                                                    345/175
2016/0209959 A1* 7/2016 Lee ................. G06F 3/044
2016/0231861 A1* 8/2016 Nagata ............. G06F 3/044

FOREIGN PATENT DOCUMENTS

| JP | 2013-206341 | 10/2013 |
| JP | 2014-186687 | 10/2014 |
| WO | 2015/045603 | 4/2015 |

* cited by examiner

FIG.12
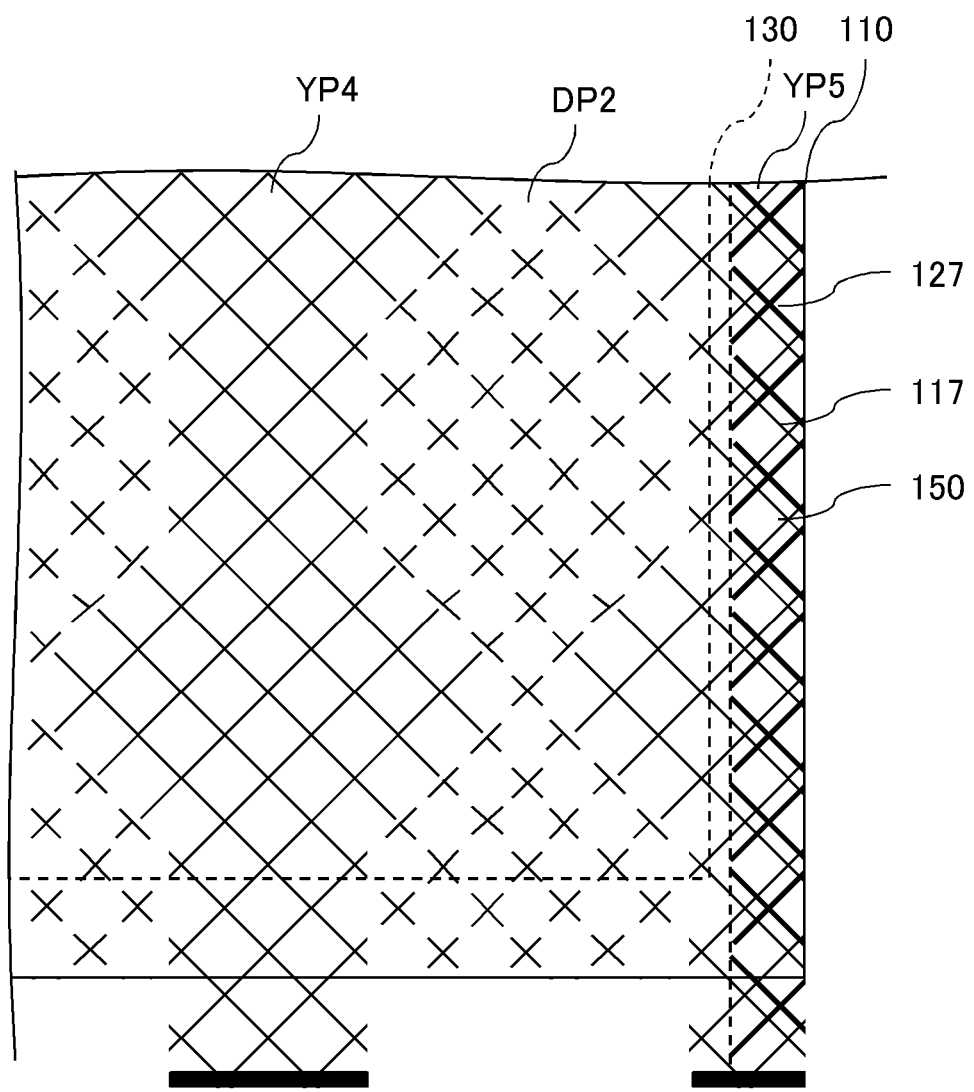
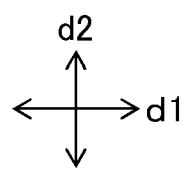

FIG.14
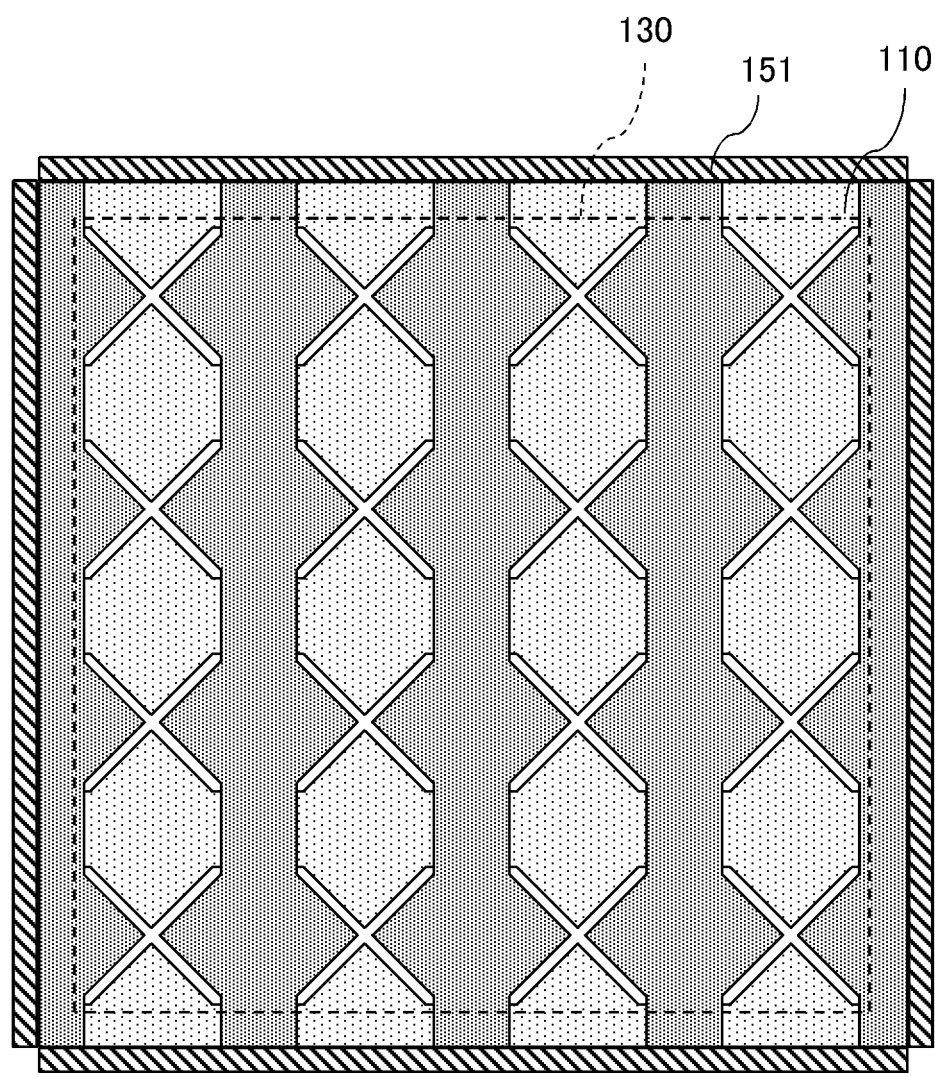
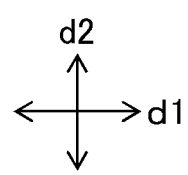

TOUCH PANEL AND DISPLAY DEVICE WITH THE SAME

CROSS-REFERENCE TO RELATED APPLICATION

This application is a bypass continuation of international patent application PCT/JP2017/004401, filed on Feb. 7, 2017 designating the United States of America. Priority is claimed based on Japanese patent application JP 2016-046640, filed on Mar. 10, 2016. The entire disclosures of these international and Japanese patent application are incorporated herein by reference in their entirety.

TECHNICAL FIELD

The present invention relates to a display device.

BACKGROUND

Recently, a display device incorporating a display panel and a touch panel has been proposed. As a touch panel system, for example, there has been known a capacitance type for detecting the position of an object from a change in capacitance between the object and a sensor electrode. A prior art discloses a display device equipped with a touch panel of the capacitance type using a mesh-shaped electrode that is partitioned into a plurality of conductive part regions and a plurality of non-conductive part regions each disposed between two of the conductive part regions (for example, see Unexamined Japanese Patent Publication No. 2010-262529).

As disclosed in the prior art, in a peripheral edge of a sensor region formed of a mesh-shaped electrode, a non-conductive part region formed in a shape cut along the contour of the peripheral edge is arranged, and the non-conductive part region is covered with a frame of a display device.

Recently, a narrow frame structure with a narrow frame of a display device is desired. In the case of narrowing the frame of the display device disclosed in the prior art, the non-conductive part region located on the peripheral edge of the sensor region protrudes from the frame. When the non-conductive part region protrudes from the peripheral edge of the frame, sensor detection sensitivity at the vicinity of the protruding non-conductive part region becomes insufficient. As a result, sensor detection sensitivity in a peripheral edge portion of a touch region on which touch operation is performed is also reduced.

The present invention has been accomplished in view of the above-mentioned problem, and an object thereof is to provide a touch panel capable of achieving frame narrowing and improving sensor detection sensitivity at a peripheral edge portion of a touch region, and a display device with the touch panel.

SUMMARY

According to the present invention, in the touch panel, it is possible to achieve frame narrowing and to improve the sensor detection sensitivity at the peripheral edge portion of the touch region.

In one general aspect, the instant application describes a touch panel comprising: a plurality of first electrodes that extend in a first direction and are arrayed in a second direction intersecting the first direction; a plurality of second electrodes that extend in the second direction and are arrayed in the first direction; and an insulating film disposed between the plurality of first electrodes and the plurality of second electrodes. Each of the plurality of first electrodes and each of plurality of the second electrodes are constructed with a plurality of conductive wires, the plurality of conductive wires having mesh shape. Each of the plurality of first electrodes is formed such that a plurality of wide portions and a plurality of narrow portions, each of the plurality of narrow portions having a width that is a length in the second direction narrower than each of the plurality of wide portions, are alternately arranged in the first direction, and one wide portion from the plurality of wide portions and one narrow portion from the plurality of narrow portions in an endmost first electrode formed at an end among the plurality of first electrodes are narrower than one wide portion from the plurality of wide portions and one narrow portion from the plurality of narrow portions in an inner first electrode located inside the endmost first electrode, respectively.

The above general aspect may include one or more of the following features. Each of the plurality of second electrodes may be formed such that the plurality of wide portions and the plurality of narrow portions, each of the plurality of narrow portions having a width that is a length in the first direction narrower than each of the plurality of wide portions, are alternately arranged in the second direction. One wide portion of the plurality of wide portions and one narrow portion of the plurality of narrow portions in an endmost second electrode formed at an end among the plurality of second electrodes may be narrower than one wide portion of the plurality of wide portions and one narrow portion of the plurality of narrow portions in an inner second electrode located inside the endmost second electrode, respectively.

The endmost first electrode constitutes a first electrode located at both ends in the second direction among the plurality of first electrodes, the endmost second electrode constitutes a second electrode located at both ends in the first direction among the plurality of second electrodes. An end outline in the second direction of the endmost first electrode may be formed in a straight line in the first direction. An end outline in the first direction of the endmost second electrode may be formed in a straight line in the second direction.

An external shape of a sensor region constructed with the plurality of first electrodes and the plurality of second electrodes may be formed into a rectangular shape in plan view of the touch panel.

The endmost first electrode may be formed into a shape in which the wide portion and the narrow portion of the inner first electrode are cut in the first direction, and the endmost second electrode may be formed into a shape in which the wide portion and the narrow portion of the inner second electrode are cut in the second direction.

A width in the endmost first electrode may be larger than a half of a width in the inner first electrode, and a width in the endmost second electrode may be larger than a half of a width in the inner second electrode.

Mesh density of a part of the endmost first electrode may be larger than mesh density of the inner first electrode, and mesh density of a part of the endmost second electrode my be larger than mesh density of the inner second electrode.

A first reinforcing conductive wire may be formed in a part of the endmost first electrode, a second reinforcing conductive wire may be formed in a part of the endmost second electrode. The first reinforcing conductive wire, the second reinforcing conductive wire, the plurality of conductive wires of the endmost first electrode, and the plurality of conductive wires of the endmost second electrode may be formed so as to intersect with one another in plan view.

The mesh density of the part of the endmost first electrode may be determined such that time constants of the endmost first electrode and the inner first electrode become equal to each other. The mesh density of the part of the endmost second electrode is determined such that time constants of the endmost second electrode and the inner second electrode become equal to each other.

A first extension wire that is conductive with the endmost first electrode may be formed outside the endmost first electrode, and a second extension wire that is conductive with the endmost second electrode may be formed outside the endmost second electrode.

A width in the first extension wire may be determined such that time constants of the endmost first electrode and the inner first electrode become equal to each other, and a width in the second extension wire may be determined such that time constants of the endmost second electrode and the inner second electrode become equal to each other.

A dummy electrode that is not conductive with the first electrode and the second electrode may be formed between two adjacent first electrodes from the plurality of first electrodes and between two adjacent second electrodes from the plurality of second electrodes.

Lead wires may be electrically connected to each of the plurality of first electrodes and each of the plurality of second electrodes, and a ground wire may be formed along the lead wires.

A display device comprising the touch panel; and a display panel that displays an image.

The display device may further comprises a frame that covers peripheries of the touch panel and the display panel. A part of the endmost first electrode may be exposed from the frame.

In another general aspect, a touch panel of the instant application comprising a plurality of first electrodes that extend in a first direction and are arrayed in a second direction intersecting the first direction, a plurality of second electrodes that extend in the second direction and are arrayed in the first direction, an insulating film disposed between the plurality of first electrodes and the plurality of second electrodes. Each of plurality of the first electrodes and each of plurality of the second electrodes are constructed with a plurality of mesh shaped conductive wires, each of plurality of the first electrodes is formed such that a plurality of wide portions and a plurality of narrow portions, each of the plurality of narrow portions having a width that is a length in the second direction narrower than each of the plurality of wide portions, are alternately arranged in the first direction, each of the plurality of second electrodes is formed such that a plurality of wide portions and a plurality of narrow portions, each of the plurality of narrow portions which having a width that is a length in the first direction narrower than each of the plurality of the wide portions, are alternately arranged in the second direction, an end outline in the second direction of endmost first electrodes, which are formed at both ends among the plurality of first electrodes, is formed in a straight line in the first direction, and an end outline in the first direction of endmost second electrodes, which are formed at both ends among the plurality of second electrodes, is formed in a straight line in the second direction.

BRIEF DESCRIPTION OF THE DRAWINGS

FIG. 12 is a view illustrating an example of second reinforcing conductive wires that are added to second electrode YP;

FIG. 14 is a plan view illustrating a region where extension wires are added;

DETAILED DESCRIPTION

Exemplary embodiments of the present disclosure will be described below with reference to the accompanying drawings. For convenience, components having the same or similar functions are designated by the same reference marks, and their description is omitted.

Figure 1:
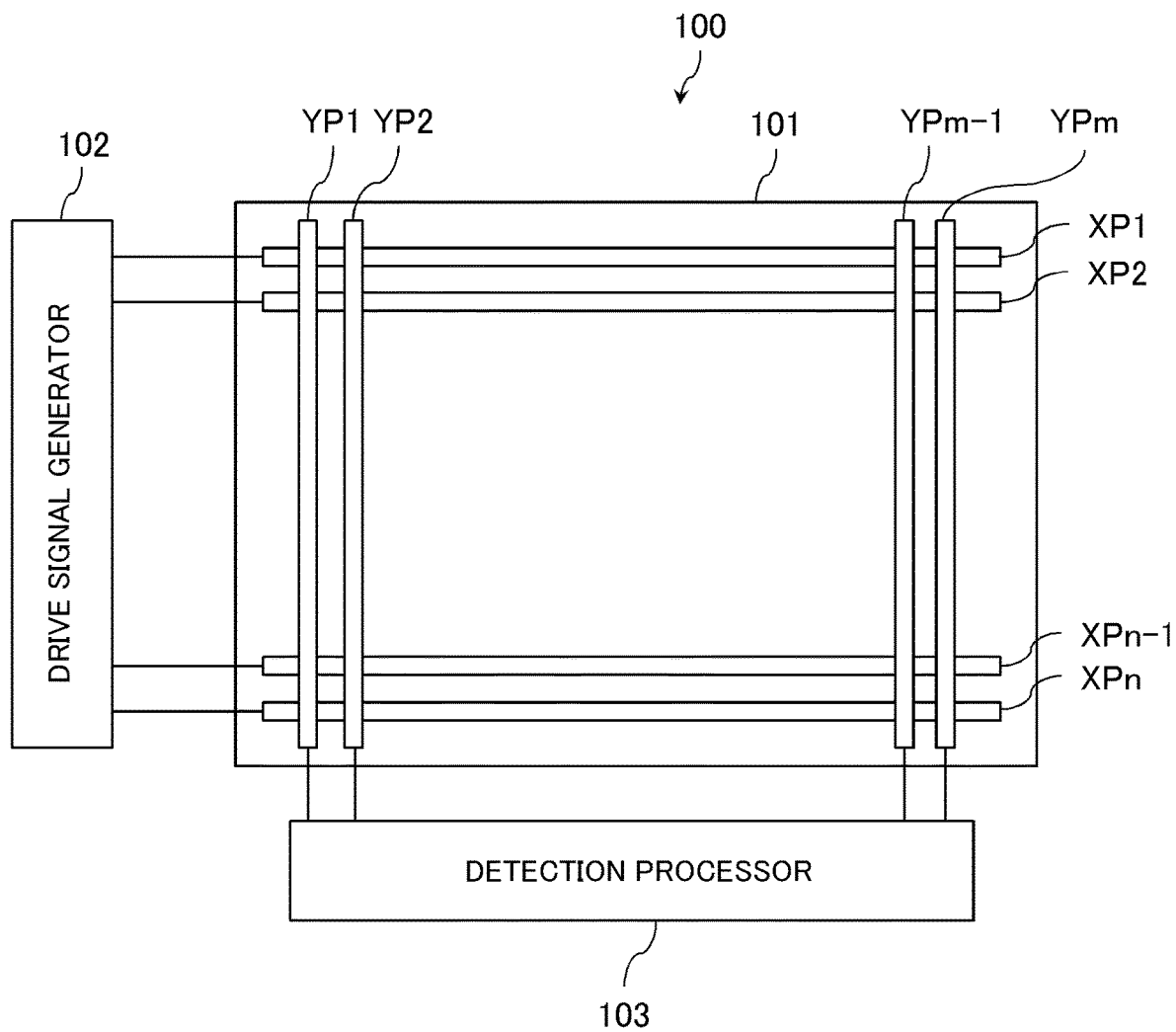
FIG. 1 is a view schematically illustrating an overall configuration of a touch panel device including a touch panel according to a present exemplary embodiment.

FIG. 1 is a view schematically illustrating an overall configuration of touch panel device 100 including touch panel 101 according to the present exemplary embodiment. As illustrated in FIG. 1, touch panel device 100 includes, for example, touch panel 101, drive signal generator 102, and detection processor 103. Note that drive signal generator 102 and detection processor 103 may be configured by one controller.

Touch panel 101 includes a plurality of first electrodes XP (XP1 to XPn) extending in first direction d1 and a plurality of second electrodes YP (YP1 to YPm) extending in second direction d2 that intersects with first direction d1. More specifically, the second direction d2 is perpendicular to first direction d1. First electrodes XP are arranged at intervals in second direction d2, and second electrodes YP are arranged at intervals in first direction d1. Insulating films or the like are formed between first electrodes XP and second electrodes YP, and first electrodes XP and second electrodes YP are arranged so as to intersect with each other in plan view. Herein, n and m are integers of 1 or more.

In the following description, first electrode XP is written in explaining a configuration which is common among first electrodes XP1 to XPn. Likewise, second electrode YP is written in explaining a configuration which is common among second electrodes YP1 to YPm.

Drive signal generator 102 sequentially outputs drive signals (pulse signals) for driving the electrodes to the first electrodes XP. Specifically, drive signal generator 102, for example, outputs pulse signals sequentially from first electrode XP1 to first electrode XPn.

Detection processor 103 detects the presence or absence of a touch on touch panel 101 and a touched position, based on a change in capacitance between first electrode XP and second electrode YP based on the presence or absence of the touch. Specifically, capacitance (interelectrode capacitance) generates between first electrode XP and second electrode YP, based on the pulse signal input to first electrode XP. The interelectrode capacitance varies depending on the presence or absence of a touch on touch panel 101. When a contact object such as a finger touches on touch panel 101, capacitance (touch capacitance) generates between the contact object and each electrode. The interelectrode capacitance therefore becomes smaller in accordance with the touch capacitance. The presence or absence of a touch on touch panel 101 and a touched position are detected in such a manner that the change in interelectrode capacitance is acquired as a sensor signal.

Figure 2:
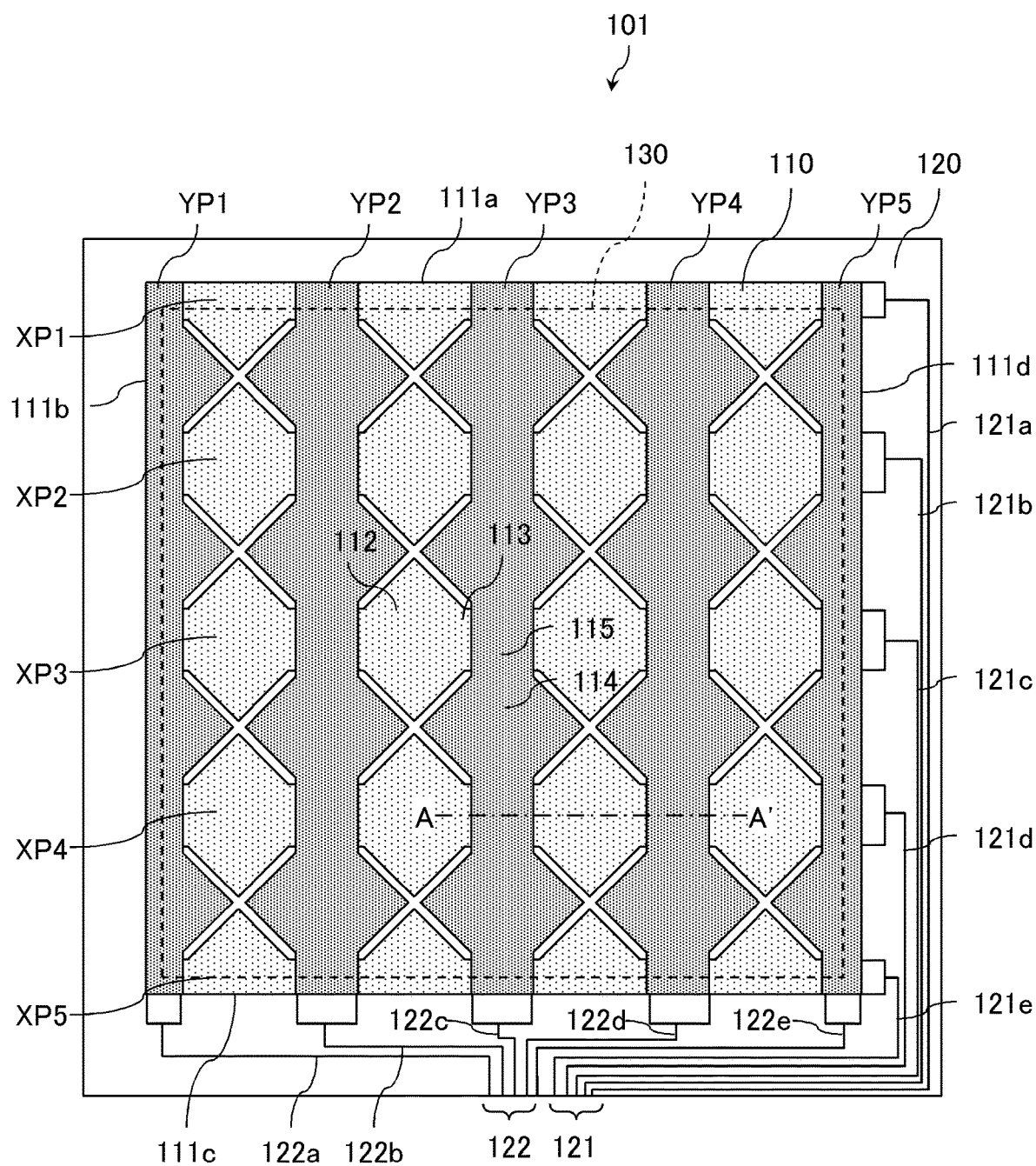
FIG. 2 is a view schematically illustrating the touch panel according to the present exemplary embodiment.

A specific configuration of touch panel 101 according to the present exemplary embodiment will be described. FIG. 2 is a view schematically illustrating touch panel 101 according to the present exemplary embodiment. As illustrated in FIG. 2, touch panel 101 includes sensor region 110 and frame region 120. In sensor region 110, touch region 130 is located.

Figure 3:
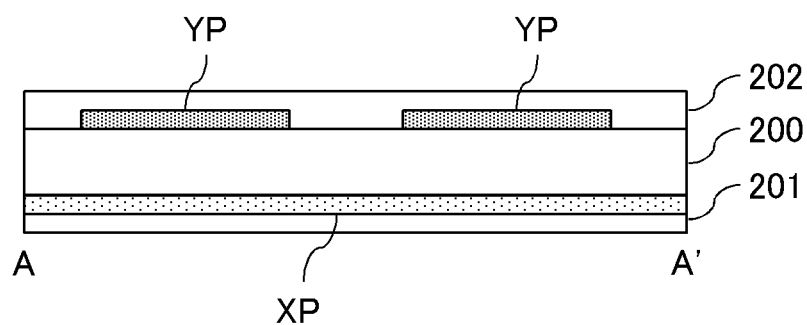
FIG. 3 is a sectional view taken along line A-A' in FIG. 2.

Sensor region 110 is a region in which first electrode XP and second electrode YP are formed. An external shape of sensor region 110 is formed in a substantially rectangular shape having two sides (first side 111a, third side 111c) extending in first direction d1 and two sides (second side 111b, fourth side 111d) extending in a column direction, in plan view. In FIG. 2, in sensor region 110, five first electrodes XP (XP1 to XP5) extending in first direction d1 and five second electrodes YP (YP1 to YP5) extending in second direction d2 are formed. FIG. 3 is a sectional view taken along line A-A' in FIG. 2. As illustrated in FIG. 3, first electrode XP is formed on one surface of insulating film 200, and second electrode YP is formed on the other surface of insulating film 200. Below first electrode XP, lower insulating layer 201 is formed so as to cover first electrode XP. Above second electrode YP, upper insulating layer 202 is formed so as to cover second electrode YP. First electrode XP and second electrode YP are formed at a distance from each other via insulating film 200. A position of first electrode XP and a position of second electrode YP may be reversed.

Frame region 120 is a frame-shaped region surrounding sensor region 110 and a region on which frame 104 of the display device incorporating touch panel 101 is superimposed. A part of frame 104 is superimposed on a peripheral edge portion of sensor region 110. In sensor region 110, a region where touch operation is performed, that is, a region on which frame 104 is not superimposed is touch region 130.

In frame region 120, first lead wires 121 (121a to 121e) electrically connecting each of first electrodes XP to drive signal generator 102 (not illustrated) and second lead wires 122 (122a to 122e) electrically connecting each of second electrodes YP to detection processor 103 (not illustrated) are formed. A drive signal is output to first electrode XP from drive signal generator 102 (not illustrated) via first lead wire 121. A sensor signal is output to detection processor 103 (not illustrated) from second electrode YP via second lead wire 122.

Figure 4:
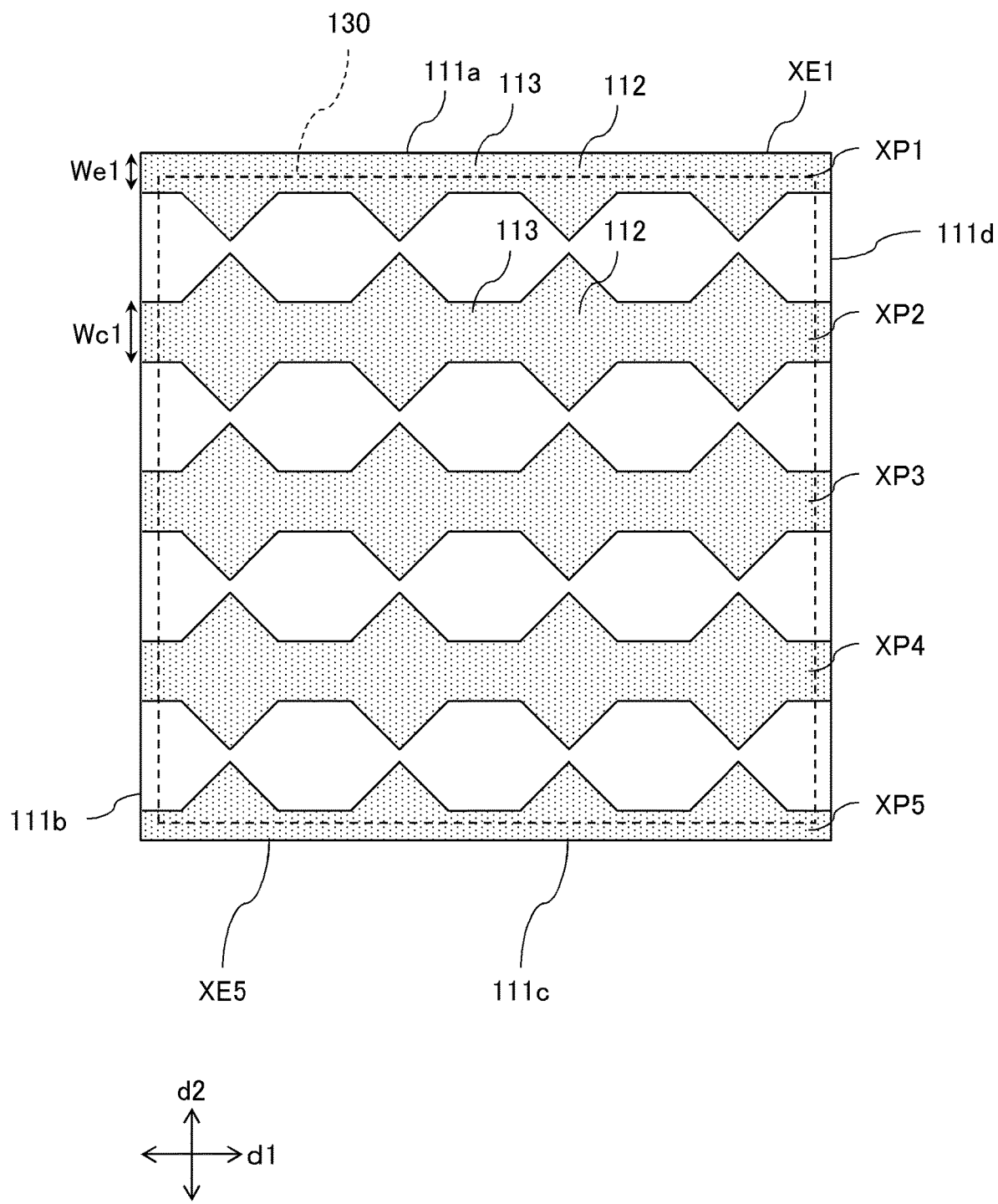
FIG. 4 is a plan view illustrating a configuration of first electrode XP according to the present exemplary embodiment.
Figure 5:
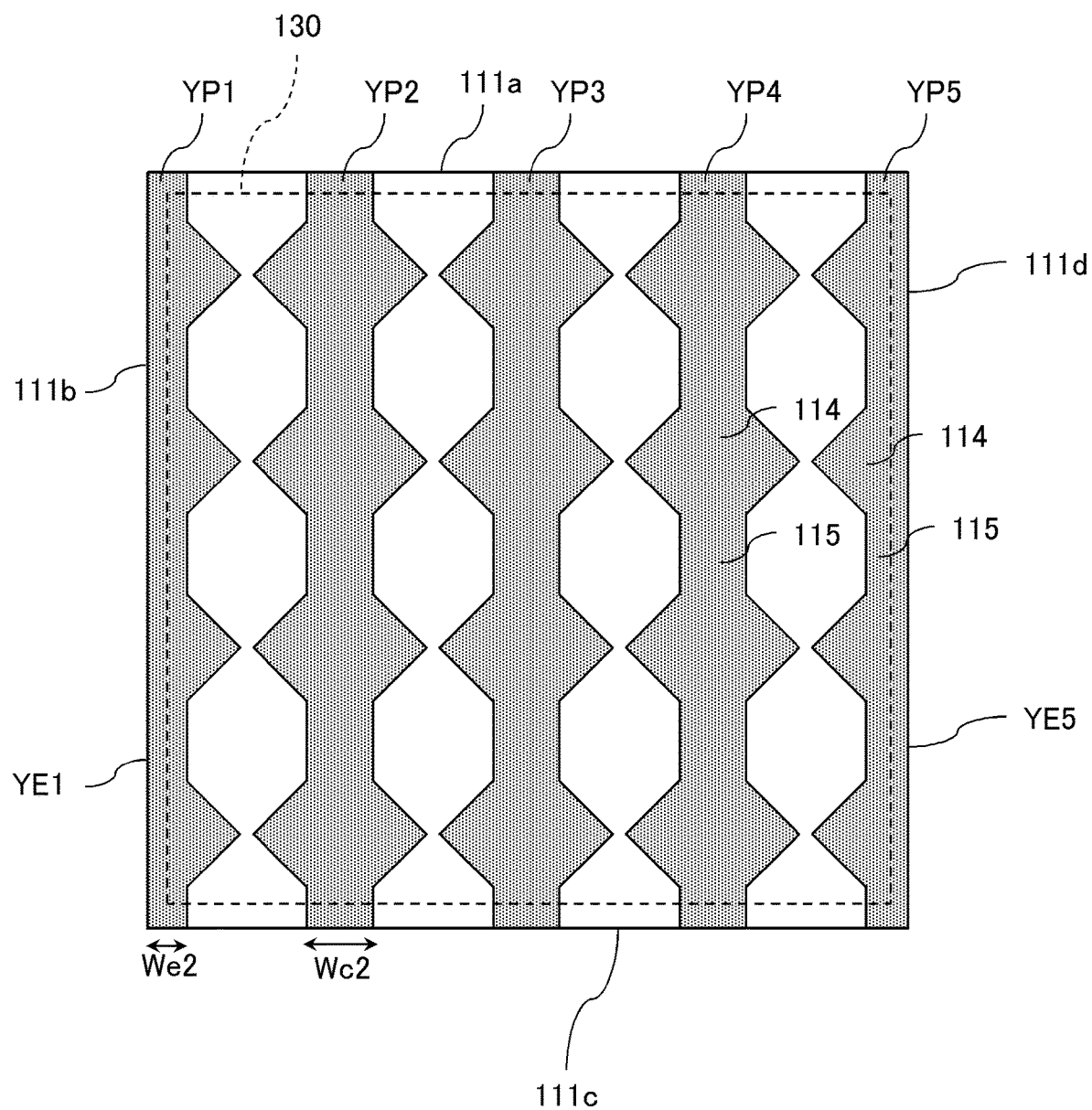
FIG. 5 is a plan view illustrating a configuration of second electrode YP according to the present exemplary embodiment.

Configurations of first electrodes XP and second electrodes YP illustrated in FIG. 2 will be described in detail. FIG. 4 is a plan view illustrating a configuration of first electrodes XP according to the present exemplary embodiment. FIG. 5 is a plan view illustrating a configuration of second electrodes YP according to the present exemplary embodiment.

As illustrated in FIG. 4, first electrode XP extends in first direction d1 and has a shape in which a width or a length in second direction d2 changes periodically. Specifically, in first electrode XP, first wide portion 112 having a large width and first narrow portion 113 having a small width are formed so as to be arranged alternately.

Notably, first electrodes XP located at both ends of sensor region 110, that is, both ends in second direction d2 (hereinafter referred to as outermost first electrodes XPj) are different in shape from first electrodes XP located inside outermost first electrodes XPj (hereinafter referred to as inner first electrodes XPi). In FIG. 4, first electrode XP1 located on first side 111a and first electrode XP5 located on third side 111c correspond to outermost first electrodes XPj. First electrode XP2 to first electrode XP4 correspond to inner first electrodes XPi. In inner first electrode XPi, first wide portion 112 having a rhombic shape and first narrow portion 113 having a rectangular shape are formed so as to be arranged alternately in first direction d1. In outermost first electrode XPj, first wide portion 112 having a triangular shape and first narrow portion 113 having a rectangular shape are formed so as to be arranged alternately in first direction d1. In the present exemplary embodiment, end outline (end outline XE1, end outline XE5) located on the outer side in second direction d2 of outermost first electrode XPj are formed in a straight line in first direction d1. Hereinafter, the end outline (end outline XE1, end outline XE5) located on the outer side in second direction d2 of outermost first electrode XPj refers a straight line connecting ends, located on the outer side in second direction d2, of first conductive wires 116 constituting outermost first electrode XPj. Outermost first electrode XPj is formed into a shape as such first wide portion 112 and first narrow portion 113 of inner first electrode XPi are cut in first direction d1, as a whole. First wide portion 112 of outermost first electrode XPj is narrower than first wide portion 112 of inner first electrode XPi with regard to the width or the length in second direction d2. First narrow portion 113 of outermost first electrode XPj is narrower than first narrow portion 113 of inner first electrode XPi with regard to the width or the length in second direction d2. Outermost first electrode XPj is formed so that a part of outermost first electrode XPj is exposed from touch region 130 in plan view. In the present exemplary embodiment, outermost first electrode XPj is formed such that a part of first wide portion 112 and a part of first narrow portion 113 of outermost first electrode XPj are exposed from touch region 130 side in plan view.

Similarly, as illustrated in FIG. 5, second electrode YP extends in second direction d2 and has such a shape in which a width or a length in first direction d1 changes periodically. Specifically, in second electrode YP, second wide portion 114 having a large width and second narrow portion 115 having a small width are formed so as to be arranged alternately.

Notably, second electrodes YP located at both ends of sensor region 110, that is, both ends in first direction d1 (hereinafter referred to as outermost second electrodes YPj) are different in shape from second electrodes YP located inside outermost second electrodes YPj (hereinafter referred to as inner second electrodes YPi). In FIG. 5, second electrode YP1 located on second side 111b and second electrode YP5 located on fourth side 111d correspond to outermost second electrodes YPj. Second electrode YP2 to second electrode YP4 correspond to inner second electrodes YPi. In inner second electrode YPi, second wide portion 114 having a rhombic shape and second narrow portion 115 having a rectangular shape are formed so as to be arranged alternately in second direction d2. In outermost second electrode YPj, second wide portion 114 having a triangular shape and second narrow portion 115 having a rectangular shape are formed so as to be arranged alternately. In the present exemplary embodiment, end outline (end outline YE1, end outline YE5) located on the outer side in first direction d1 of outermost second electrode YPj are formed in a straight line in second direction d2. Outermost second electrode YPj is formed in such a shape that second wide portion 114 and second narrow portion 115 of inner second electrode YPi are cut in second direction d2, as a whole. Second wide portion 114 of outermost second electrode YPj is narrower than second wide portion 114 of inner second electrode YPi with regard to the width or the length in first direction d1. Second narrow portion 115 of outermost second electrode YPj is narrower than second narrow portion 115 of inner second electrode YPi with regard to the width or the length in first direction d1. Outermost second electrode YPj is formed so that a part of outermost second electrode YPj is exposed from touch region 130 in plan view. In the present exemplary embodiment, outermost second electrode YPj is formed such that a part of second wide portion 113 and a part of second narrow portion 114 of outermost second electrode YPj are exposed from touch region 130 side in plan view.

In the present exemplary embodiment, first electrodes XP illustrated in FIG. 4 and second electrodes YP illustrated in FIG. 5 are superimposed on each other, so that sensor region 110 illustrated in FIG. 2 is formed. As illustrated in FIG. 2, first wide portion 112 and second wide portion 114 are arranged so as not to be superimposed in plan view, and are arranged such that a part of first narrow portion 113 and a part of second narrow portion 115 intersect with each other in plan view. First wide portion 112 and second wide portion 114 may be arranged such that entire first narrow portion 113 and entire second narrow portion 115 intersect each other in a plan view.

Figure 6:
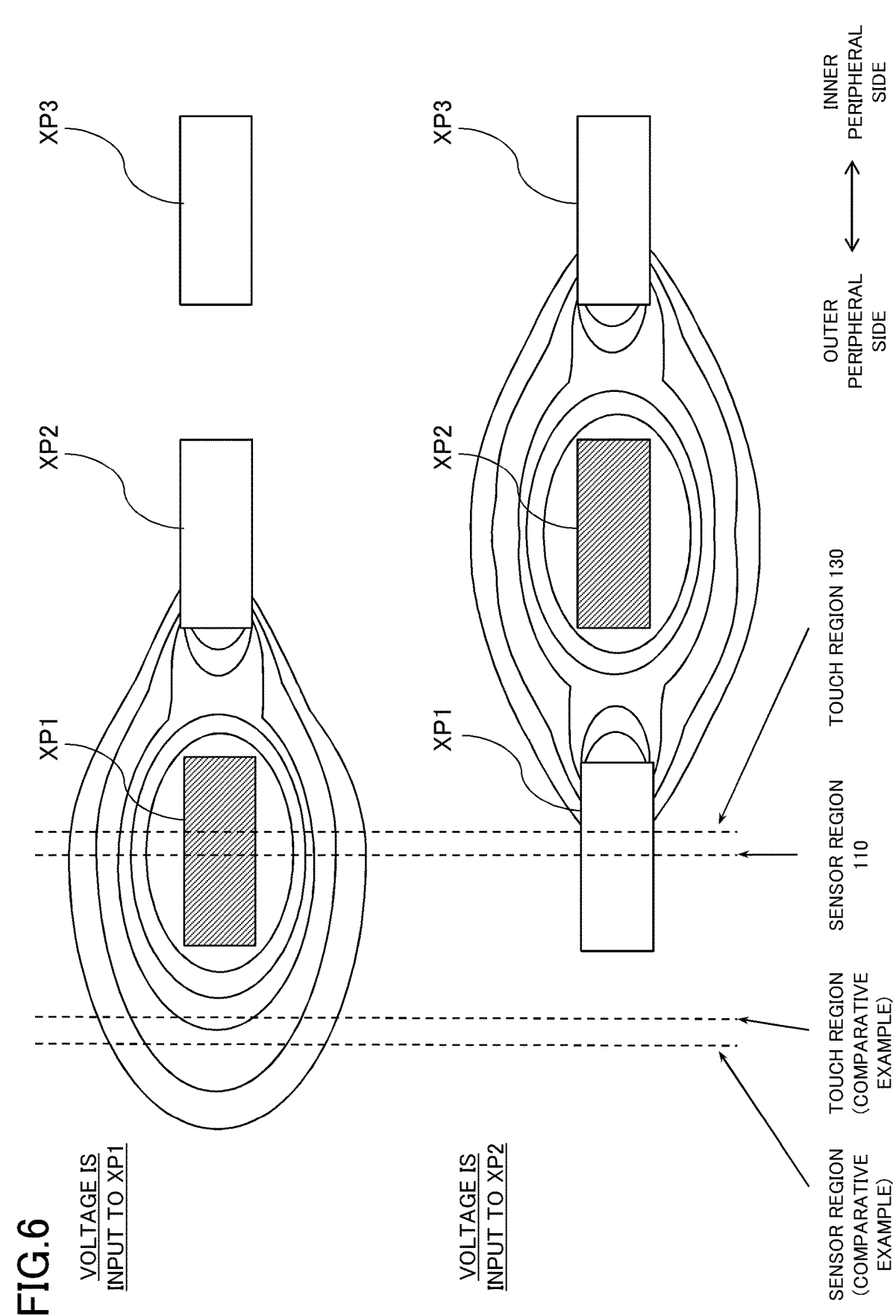
FIG. 6 is a view for explaining electric field intensity of a sensor region and is a sectional view of the touch panel taken along a plane perpendicular to a first direction.

FIG. 6 is a view illustrating electric field intensity of sensor region 110. FIG. 6 is a sectional view illustrating the touch panel taken along a plane perpendicular to the first direction d1. FIG. 6 illustrates some (first electrode XP1 to first electrode XP3) of first electrodes XP. The upper half of FIG. 6 shows view illustrating an electric field distribution in a case where voltage is applied to first electrode XP1 as outermost first electrode XPj, and the lower half of FIG. 6 shows an electric field distribution view in a case where voltage is applied to first electrode XP2 as inner first electrode XPi. As illustrated in FIG. 6, the electric field intensity on an outer peripheral side of outermost first electrode XP1 is lower than the electric field intensity on an inner peripheral side of outermost first electrode XP1.

Therefore, in the case where non-conductive part is located on the peripheral edge portion of the sensor region such as the display device disclosed in the prior art (refer to a comparative example in FIG. 6), the electric field intensity at the peripheral edge portion of the touch region according to the comparative example is lower than the electric field intensity at the inside of the touch region according to the comparative example. Meanwhile, in the case of the present exemplary embodiment, since outermost first electrode XPj is located on the peripheral edge portion of touch region 130, the electric field intensity at the peripheral edge portion of touch region 130 is almost same level as the electric field intensity at the inside of touch region 130. In FIG. 6, a view of the electric field distribution from first electrode XP1 to first electrode XP3 is illustrated as an example. A similar view of electric distribution is realized even around outermost first electrode XP5 and outermost second electrode YPj. As described above, in the present exemplary embodiment, the electric field intensity at the peripheral edge portion of touch region 130 can be set as the same level as compared with the electric field intensity at the inside of touch region 130, and the sensor detection sensitivity at the peripheral edge portion of touch region 130 can be improved.

Moreover, in the present exemplary embodiment, first wide portion 112 and first narrow portion 113 of outermost first electrode XPj are smaller in width than first wide portion 112 and first narrow portion 113 of inner first electrode XPi which are located more inside than outermost first electrode XPj, respectively. Further, second wide portion 114 and second narrow portion 115 of outermost second electrode YPj are smaller in width than second wide portion 114 and second narrow portion 115 of inner second electrode YPi which are located more inside than outermost second electrode YPj, respectively. Therefore, it is possible to ensure the sensor detection sensitivity at the peripheral edge portion of touch region 130 and to adjust a size of sensor region 110 in accordance with its specific design. Thus, by determining the width in outermost first electrode XPj or outermost second electrode YPj in accordance with the size of frame 104, it is possible to achieve narrow frame. Notably, in order to effectively achieve narrow frame, the end outlines (end outline XE1, end outline XE5) located outside in second direction d2 of outermost first electrode XPj are preferably formed in a straight line in first direction d1. Furthermore, the end outlines (end outline YE1, end outline YE5) located outside in first direction d1 of outermost second electrode YPj are preferably formed in a straight line in second direction d2.

Furthermore, in the present exemplary embodiment, width We1 of first narrow portion 113 in outermost first electrode XPj may be larger than a half of width Wc1 of first narrow portion 113 in inner first electrode XPi. In addition, width We2 of second narrow portion 115 in outermost second electrode YPj may be larger than a half of width Wc2 of second narrow portion 115 in inner second electrode YPi. Thus, since areas of outermost first electrode XPj and outermost second electrode YPj are increased, the sensor detection sensitivity at the peripheral edge portion of touch region 130 can be further improved.

Note that shapes of first electrode XP and second electrode YP are not limited to the examples illustrated in FIGS. 4 and 5 and, for example, may be linear.

First electrode XP and second electrode YP according to the present exemplary embodiment are formed in a mesh shape made from conductive wires formed of a conductive material, which is high conductivity, such as copper or silver.

Figure 7:
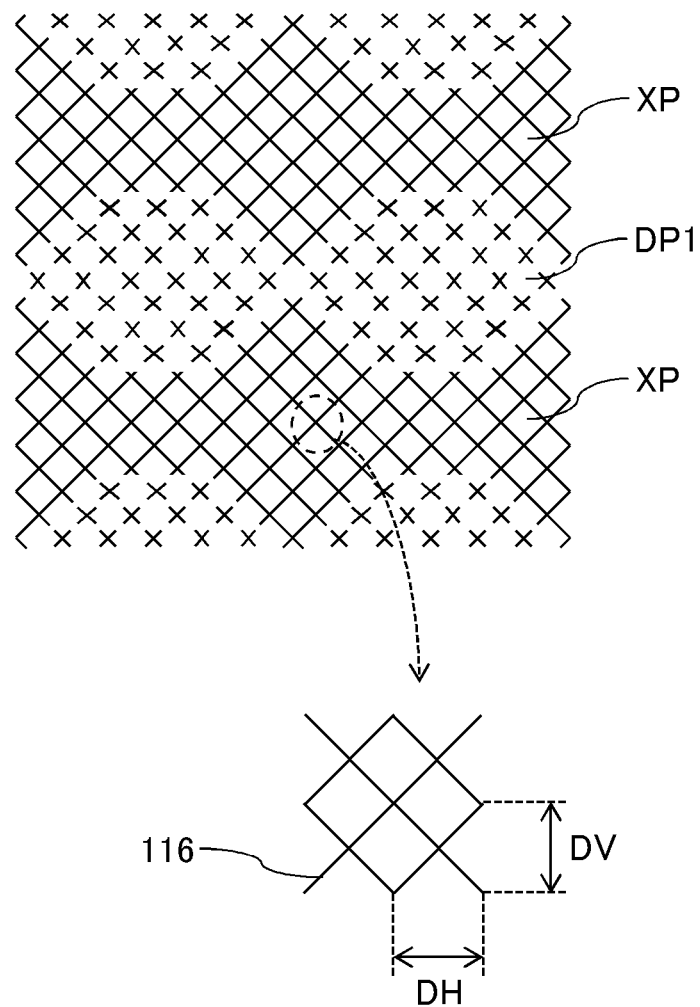
FIG. 7 is a view illustrating an example of a mesh shape of first electrode XP constituted of conductive wires.

FIG. 7 is a view illustrating an example of the mesh shape made from the conductive wires which constitute first electrode XP. As illustrated in FIG. 7, first electrode XP is composed of first conductive wires 116 which extend in some directions so as to form intersections by intersecting each other and form the mesh shape. For example, first conductive wires 116 form a mesh shape composed of squares, each of which has length DV of one of two diagonal lines and length DH of the other diagonal line. First electrode XP1 to first electrode XP5 are substantially equal to one another with regard to an occupying ratio of first conductive wires 116 to the total area of first electrode XP (mesh density). Between adjacent first electrodes XP, first dummy electrode DP1 that is not conductive with both first electrode XP and second electrode YP is formed. In FIG. 7, first dummy electrode DP1 and first electrode XP are formed on the same layer. As illustrated in FIG. 7, first dummy electrode DP1 is formed so as to create a gap between first electrode XP and first dummy electrode DP1 in plan view, so that first electrode XP and first dummy electrode DP1 are not conductive with each other. First dummy electrode DP1 may be composed of conductive wires of a mesh shape in the same manner as first electrode XP. In this case, in order to secure the nonconductivity of first dummy electrode DP1, first dummy electrode DP1 may be formed in such a shape that the conductive wires in the mesh shape are cut at many positions. First dummy electrode DP1 may be formed in a layer where neither first electrode XP nor second electrode YP is formed.

Figure 8:
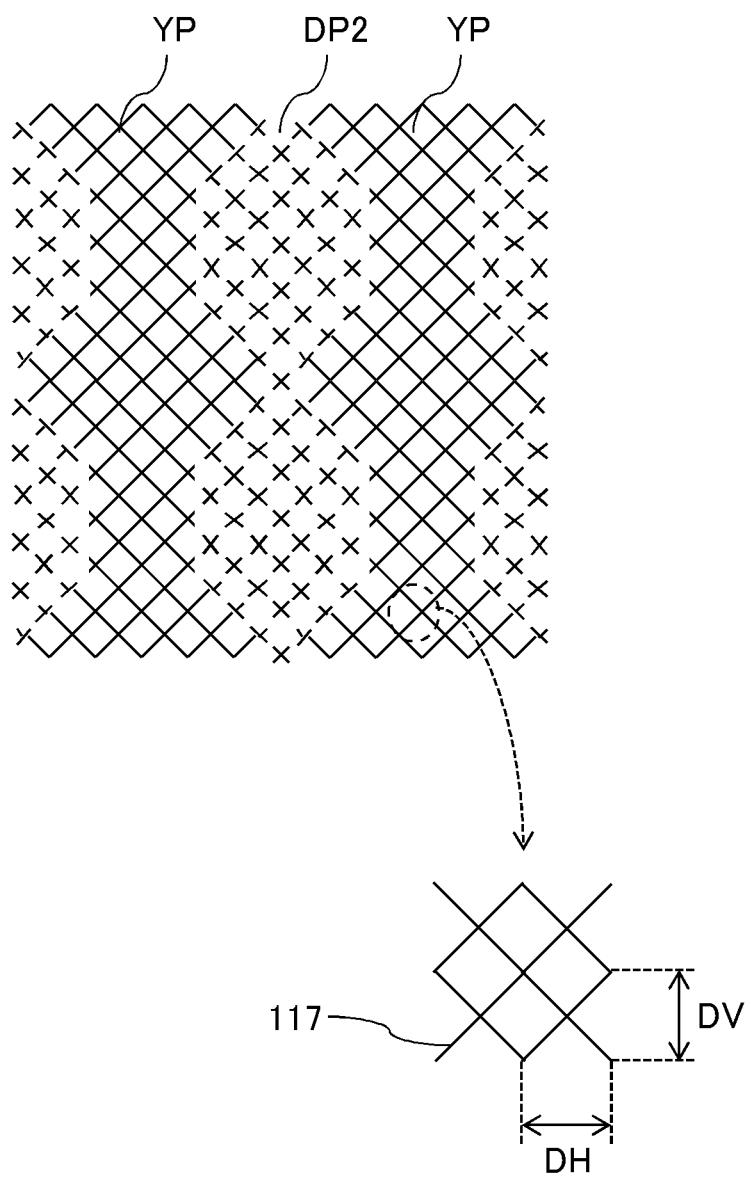
FIG. 8 is a view illustrating an example of a mesh shape of second electrode YP constituted of conductive wires.

FIG. 8 is a view illustrating an example of the mesh shape made from the conductive wires which constitute second electrode YP. As illustrated in FIG. 8, second electrode YP is composed of second conductive wires 117 which extend in some directions so as to form intersections by intersecting each other and form the mesh shape. As in first electrode XP, second conductive wires 117 form a mesh shape composed of squares each having length DV of one of two diagonal lines and length DH of the other diagonal line. Second electrode YP1 to second electrode YP5 are substantially equal to one another with regard to an occupying ratio of second conductive wires 117 to the total area of second electrode YP (mesh density). Between adjacent second electrodes YP, second dummy electrode DP2 that is not conductive with both first electrode XP and second electrode YP is formed. In FIG. 8, second dummy electrode DP2 and second electrode YP are formed in the same layer. As illustrated in FIG. 8, second dummy electrode DP2 is formed so as to create a gap between second electrode YP and second dummy electrode DP2 in plan view, so that second electrode YP and second dummy electrode DP2 are not conductive with each other. Second dummy electrode DP2 may be composed of conductive wires in a mesh shape in the same manner as second electrode YP. In this case, in order to secure the nonconductivity of second dummy electrode DP2, second dummy electrode DP2 may be formed in such a shape that conductive wires in the mesh shape are cut at many positions. Second dummy electrode DP2 may be formed in a layer where neither first electrode XP nor second electrode YP is formed.

Figure 9:
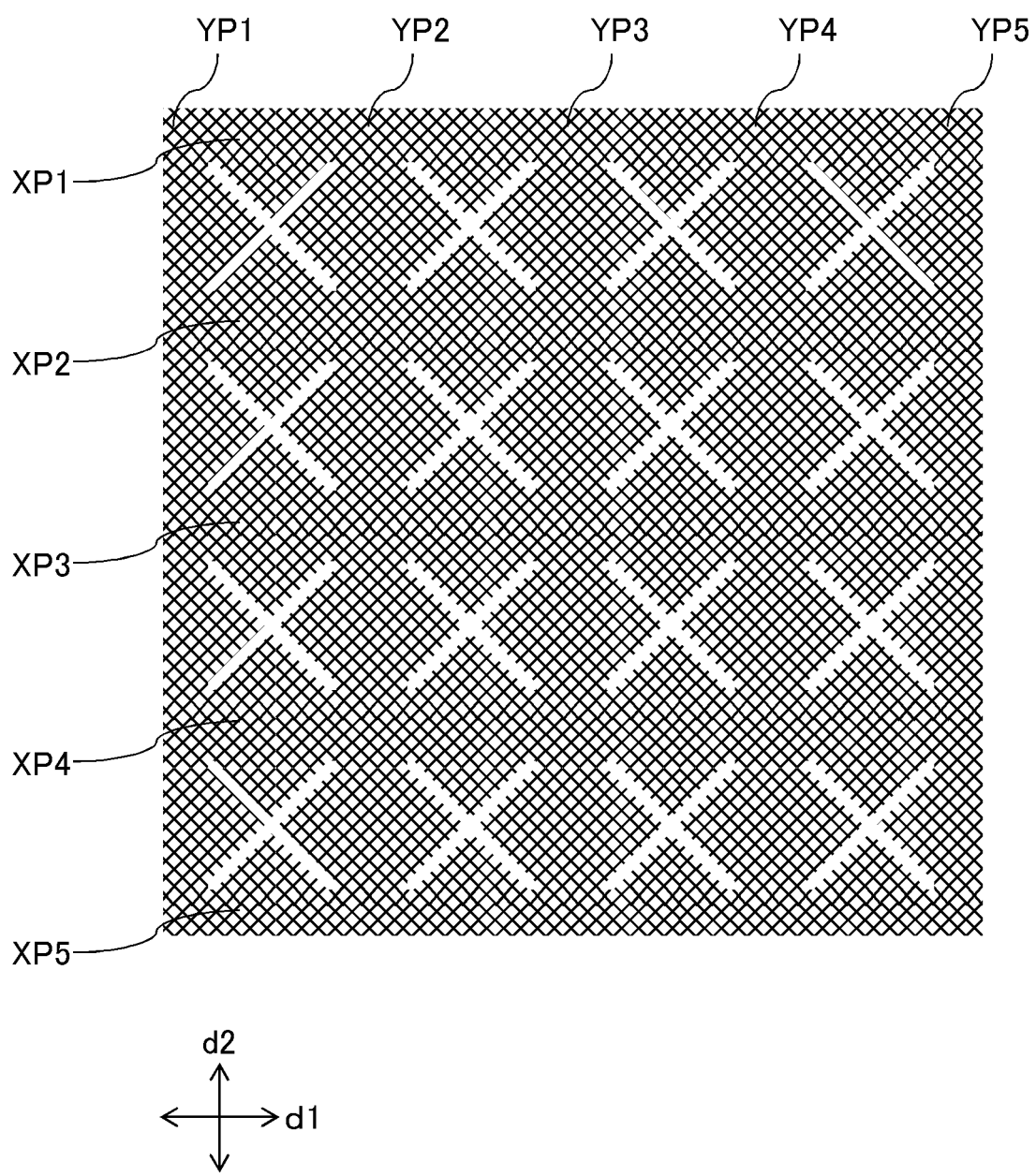
FIG. 9 is a view illustrating a sensor region composed of first electrode XP illustrated in FIG. 7 and second electrode YP illustrated in FIG. 8.

FIG. 9 illustrates sensor region 110 composed of first electrode XP illustrated in FIG. 7 and second electrode YP illustrated in FIG. 8. In sensor region 110, the first conductive wires 116 and the second conductive wires 117 are arranged so as to be displaced by a half of a distance between adjacent two of the conductive wires. The conductive wires constituting first dummy electrode DP1 and the second conductive wires 117 are arranged so as to be displaced by a half of a distance between adjacent two of the conductive wires. The conductive wires constituting second dummy electrode DP2 and the first conductive wires 116 are arranged so as to be displaced by a half of a distance between adjacent two of the conductive wires. In this manner, the distance between the conductive wires adjacent to each other in entire sensor region 110 is substantially the same. Therefore, when sensor region 110 is seen in plan view in a state where first electrode XP and second electrode YP are superimposed on each other, the mesh density in sensor region 110 as a whole is substantially uniform. The mesh density of first electrode XP and the mesh density of second electrode YP are substantially the same.

As described above, in the present exemplary embodiment, outermost first electrode XPj and outermost second electrode YPj are different in shape from inner first electrode XPi and inner second electrode YPi, respectively. As a result, outermost first electrode XPj and outermost second electrode YPj are different in characteristics from inner first electrode XPi and inner second electrode YPi, respectively. Specifically, since an area of outermost first electrode XPj is smaller than an area of inner first electrode XPi, the number of intersections in the mesh shape of outermost first electrode XPj is smaller than the number of intersections in the mesh shape of inner first electrode XPi. Likewise, since an area of outermost second electrode YPj is smaller than an area of inner second electrode YPi, the number of intersections in the mesh shape of outermost second electrode YPj is smaller than the number of intersections in the mesh shape of inner second electrode YPi. In particular, the number of intersections is reduced in first narrow portion 113 and second narrow portion 115 each of which has a small width. Therefore, a possibility that disconnection may occur at the intersection in the mesh shape can be manifested depending on its specific design.

Figure 10:
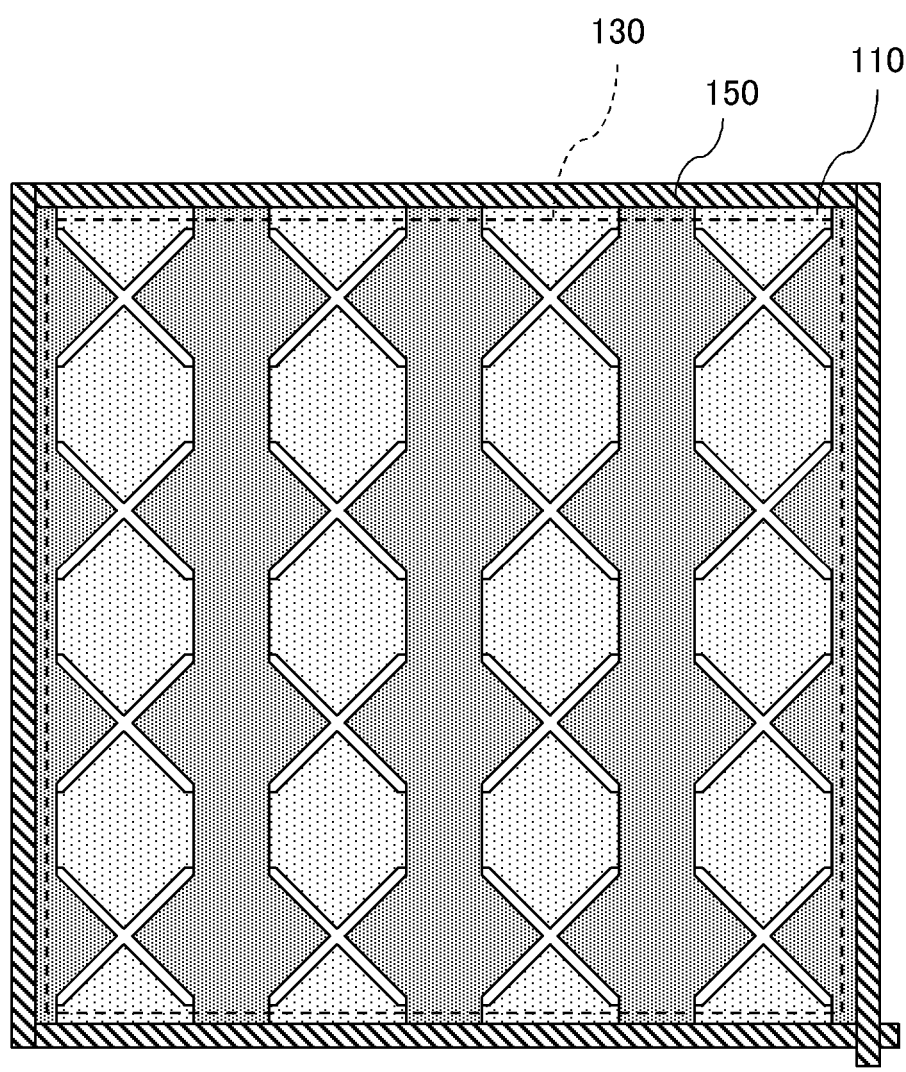
FIG. 10 is a plan view illustrating a region where reinforcing conductive wires are added.

Therefore, in the present exemplary embodiment, by adding additional reinforcing conductive wires in a part of outermost first electrode XPj, the mesh density of a part of outermost first electrode XPj is set larger than the mesh density of inner first electrode XPi. In addition, by adding additional reinforcing conductive wire in a part of outermost second electrode YPj, the mesh density in a part of outermost second electrode YPj is set larger than the mesh density of inner second electrode YPi. FIG. 10 is a plan view illustrating a region to which the reinforcing conductive wires are added. As illustrated in FIG. 10, reinforcement region 150 where the reinforcing conductive wires are added is a region corresponding to the peripheral edge portion of sensor region 110 and is included in frame region 120.

Figure 11:
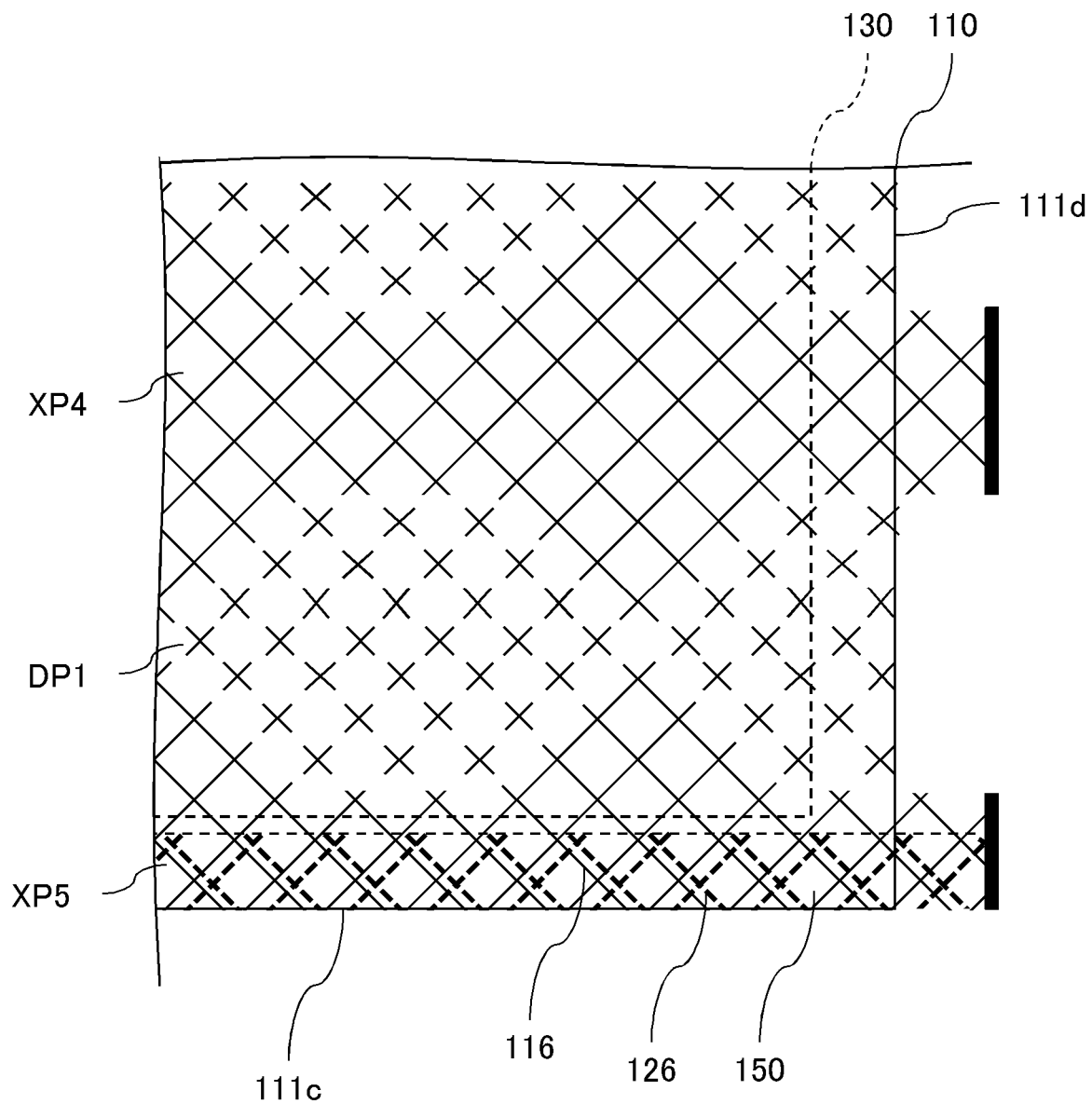
FIG. 11 is a view illustrating an example of first reinforcing conductive wires that are added to first electrode XP.

FIG. 11 is a view illustrating an example of first reinforcing conductive wires 126 that are added to first electrode XP. FIG. 11 illustrates a lower right portion of sensor region 110. As illustrated in FIG. 11, first reinforcing conductive wires 126 are formed in outermost first electrode XPj (first electrode XP5 in this example) formed on third side 111c of sensor region 110. The first reinforcing conductive wires 126 and first electrodes XP are formed in the same layer such that the first reinforcing conductive wires 126 and the first conductive wires 116 intersect with each other. When the first reinforcing conductive wires 126 are added in this way, the number of intersections in the mesh is increased in first electrode XP5 as outermost first electrode XPj. In FIG. 11, the first reinforcing conductive wires 126 and the first conductive wires 116 are alternately arranged so as to be displaced by a quarter of a distance between two adjacent first conductive wires 116, in plan view. In FIG. 11, first electrode XP5 is illustrated as an example. Likewise, first reinforcing conductive wires 126 are formed in first electrode XP1 as outermost first electrode XPj formed on first side 111a of sensor region 110.

FIG. 12 is a view illustrating an example of second reinforcing conductive wires 127 that are added to second electrode YP. FIG. 12 illustrates a lower right portion of sensor region 110. As illustrated in FIG. 12, second reinforcing conductive wires 127 are formed in outermost second electrode YPj (second electrode YP5 in this example) formed on fourth side 111d of sensor region 110. The second reinforcing conductive wires 127 and second electrodes YP are formed in the same layer such that the second reinforcing conductive wires 127 and the second conductive wires 117 intersect with each other. When the second reinforcing conductive wires 127 are added in this way, the number of intersections in the mesh is increased in second electrode YP5 as outermost second electrode YPj. In FIG. 12, the second reinforcing conductive wires 127 and the second conductive wires 117 are alternately arranged so as to be displaced by a quarter of a distance between two adjacent second conductive wires 117, in plan view. In FIG. 12, second electrode YP5 is illustrated as an example. Likewise, second reinforcing conductive wires 127 are formed in second electrode YP1 as outermost second electrode YPj formed on second side 111b of sensor region 110.

Figure 13:
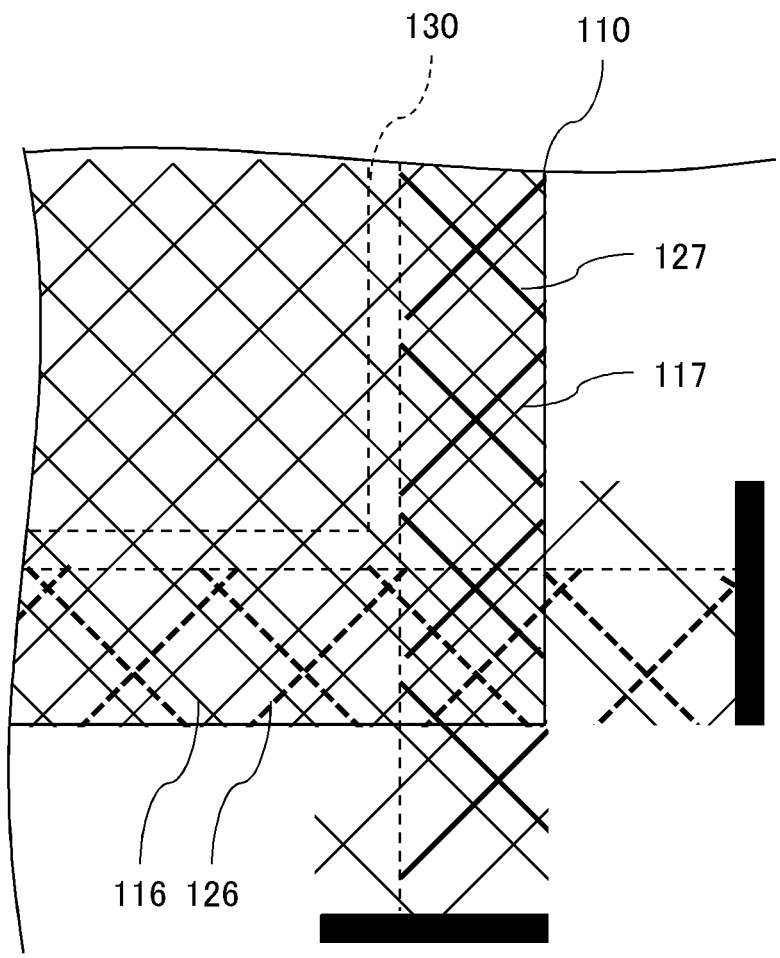
FIG. 13 is a view illustrating a sensor region composed of first electrode XP illustrated in FIG. 10 and second electrode YP illustrated in FIG. 11.

FIG. 13 is a view illustrating sensor region 110 composed of first electrode XP illustrated in FIG. 11 and second electrode YP illustrated in FIG. 12. FIG. 13 illustrates the lower right portion of sensor region 110. As described above, by providing the first reinforcing conductive wires 126 and the second reinforcing conductive wires 127, as illustrated in FIG. 13, in a region (a corner of sensor region 110) where first reinforcing conductive wires 126 and second reinforcing conductive wires 127 intersect each other, first conductive wire 116, second conductive wire 117, first reinforcing conductive wire 126, and second reinforcing conductive wire 127 are formed so as to intersect with each other in plan view. Specifically, first conductive wire 116, second conductive wire 117, first reinforcing conductive wire 126, and second reinforcing conductive wire 127 are alternately arranged so as to be displaced every quarter of a distance between two adjacent first conductive wires 116 (or second conductive wires 117) in plan view. FIG. 13 illustrates the corner where third side 111c and the fourth side 111d of sensor region 110 intersect each other. Similar arrangements are provided at the four corners of sensor region 110.

Thus, the first reinforcing conductive wires 126 are formed in outermost first electrode XPj, and the second reinforcing conductive wires 127 are formed in outermost second electrode YPj, so that the mesh density of reinforcement region 150 located in the peripheral edge portion of sensor region 110 is larger than the mesh density of touch region 130. Therefore, the number of intersections in the mesh shape in outermost first electrode XPj and the number of intersections in the mesh shape in outermost second electrode YPj are increased, so that it is possible to reduce risks of disconnection and to improve the sensor detection sensitivity at the peripheral edge portion of touch region 130.

Reinforcement region 150 is included in frame region 120, and a strip-shaped unevenness in an image is less likely to be visible due to the conductive wire due to non-uniformity of the mesh density. In addition, touch region 130 and reinforcement region 150 may be separated from each other such that reinforcement region 150 is positioned inside frame region 120 even when frame 104 is displaced.

Further, in the present exemplary embodiment, by adding a strip-shaped extension wire along outside each of outermost first electrode XPj and outermost second electrode YPj, the number of intersections in the mesh shape in outermost first electrode XPj and the number of intersections in the mesh shape in outermost second electrode YPj may be increased. FIG. 14 is a plan view illustrating a region where the extension wire is added. As illustrated in FIG. 14, extension region 151 where the extension wire is added is a region located outside sensor region 110 and is included in frame region 120.

Figure 15:
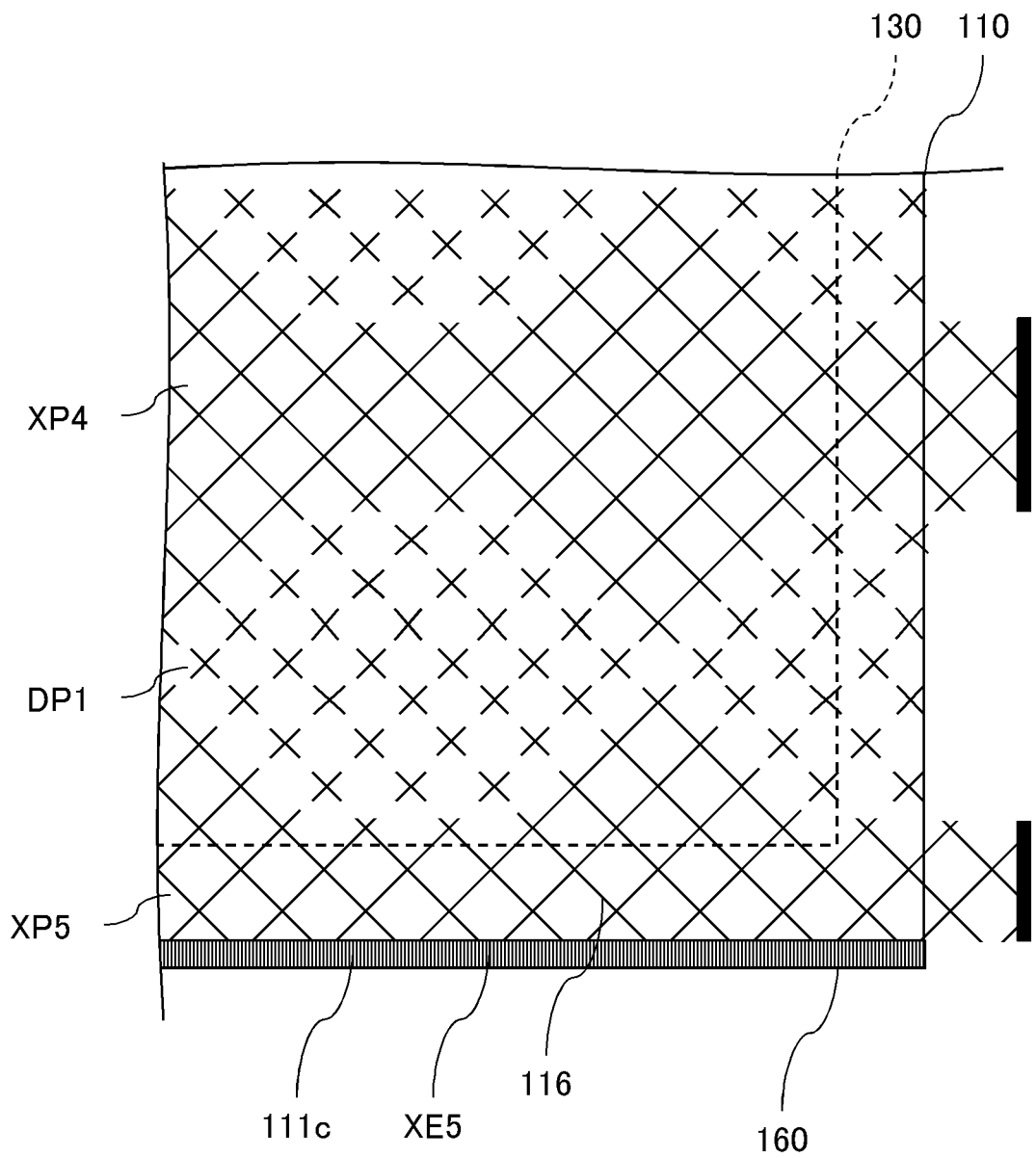
FIG. 15 is a view illustrating an example of first extension wires that are added to first electrode XP.

FIG. 15 is a view illustrating an example of first extension wire 160 that is added to first electrode XP. FIG. 15 illustrates the lower right portion of sensor region 110. As illustrated in FIG. 15, first extension wire 160 is formed additionally along end outline XE5 of outermost first electrode XPj (first electrode XP5 in this example) formed on third side 111c of sensor region 110. First extension wire 160 is a strip-shaped wire extending in first direction d1 along end outline XE5 of outermost first electrode XPj. First extension wire 160 and first electrode XP are formed in the same layer, and first extension wire 160 is disposed in an extension of first conductive wire 116. By forming first extension wire 160 in this way, the number of intersections in the mesh shape of first electrode XP5 increases. In FIG. 15, first electrode XP5 is illustrated as an example. Likewise, first extension wire 160 is formed in first electrode XP1 located along first side 111a of sensor region 110.

Figure 16:
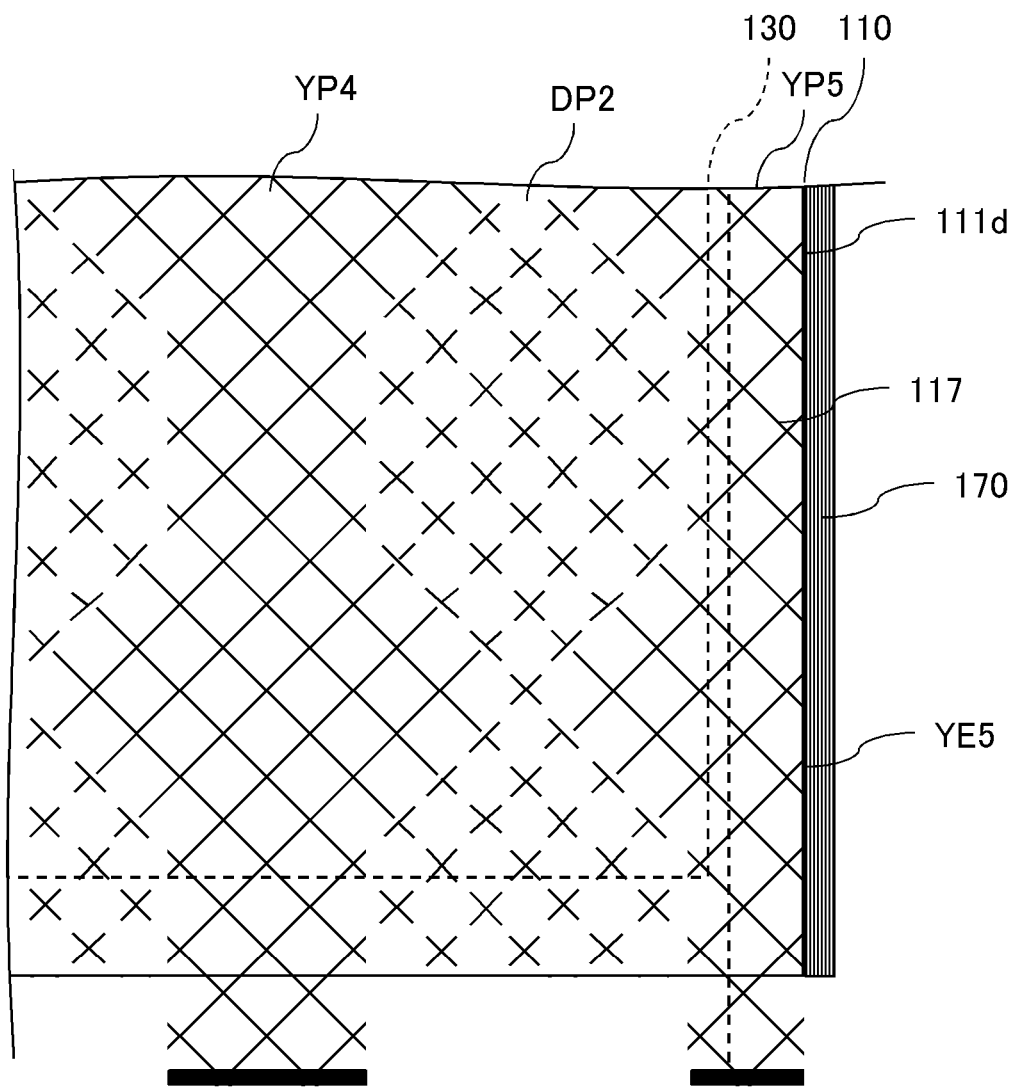
FIG. 16 is a view illustrating an example of second extension wires that are added to second electrode YP.

FIG. 16 is a view illustrating an example of second extension wire 170 that is added to second electrode YP. FIG. 16 illustrates the lower right portion of sensor region 110. As illustrated in FIG. 16, second extension wire 170 is formed additionally along end outline YE5 of outermost second electrode YPj (first electrode YP5 in this example) formed on fourth side 111d of sensor region 110. Second extension wire 170 is a strip-shaped wire extending in second direction d2 along end outline YE5 of outermost second electrode YPj. Second extension wire 170 and second electrode YP are formed in the same layer, and second extension wire 170 is disposed in an extension of second conductive wire 117. By forming second extension wire 170 in this way, the number of intersections in the mesh shape of second electrode YP5 increases. In FIG. 16, second electrode YP5 is illustrated as an example. Likewise, second extension wire 170 is formed in second electrode YP1 located along second side 111b of sensor region 110.

As described above, first extension wire 160 is formed additionally on outermost first electrode XPj, and second extension wire 170 is formed additionally on outermost second electrode YPj. Therefore, the number of intersections in the mesh shape of outermost first electrode XPj and the number of intersections in the mesh shape of outermost second electrode YPj are increased, so that it is possible to reduce the risk of the occurrence of disconnection and to improve the sensor detection sensitivity at the peripheral edge portion of touch region 130.

Figure 17:
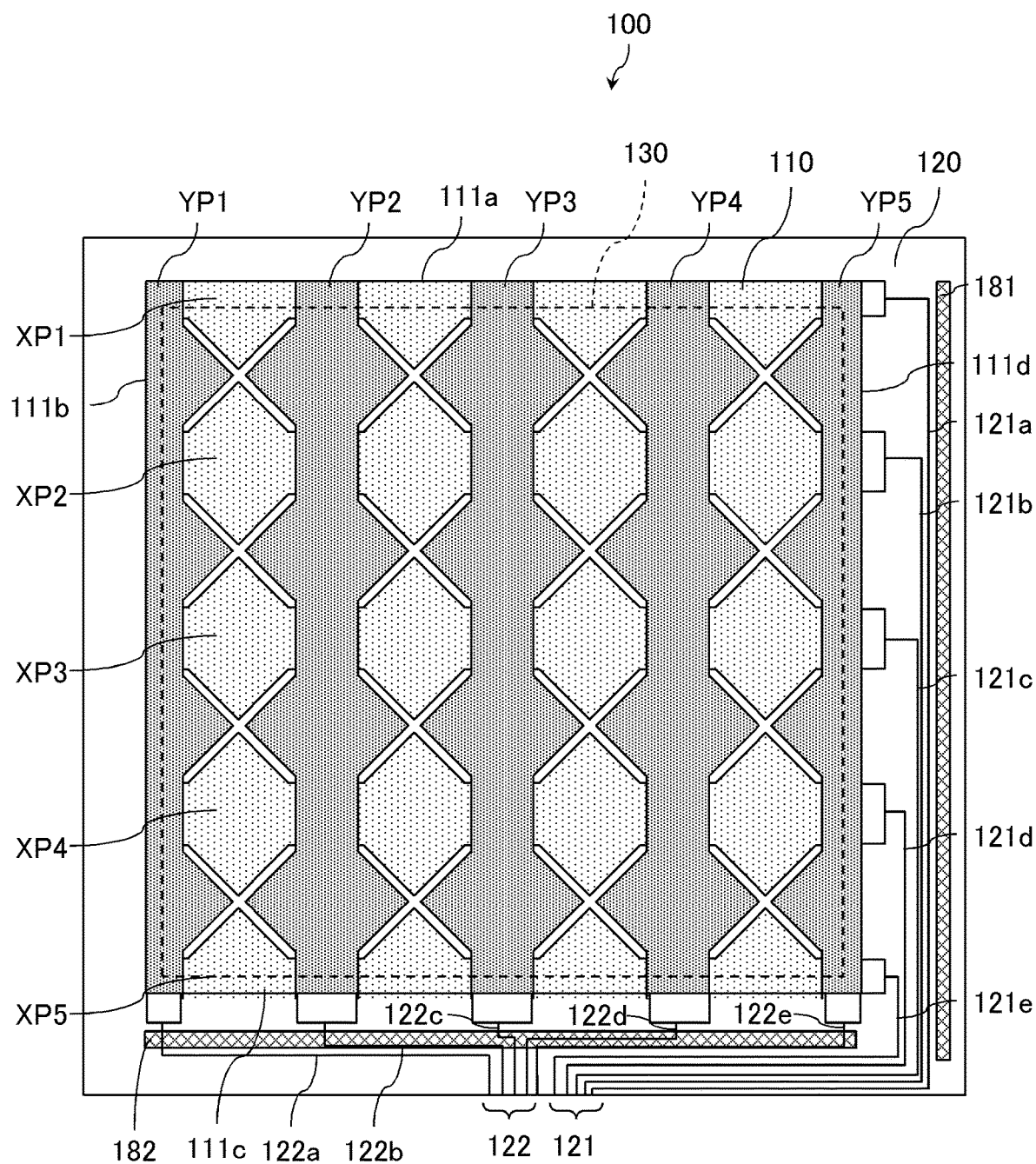
FIG. 17 is a view illustrating an example of a touch panel device in which ground wires are formed.

Further, in the present exemplary embodiment, outermost first electrode XPj and outermost second electrode YPj extend along the peripheral edge portion of sensor region 110. Therefore, a distance between outermost first electrode XPj and second lead wire 122 formed in frame region 120 becomes short, and a distance between outermost second electrode YPj and first lead wire 121 formed in frame region 120 becomes short. As a result, due to an influence of first lead wire 121 and second lead wire 122, a possibility that the sensor detection sensitivity at the peripheral edge portion of sensor region 110 decreases can be manifested depending on its specific design. Therefore, in the present exemplary embodiment, ground wires are formed along first lead wire 121 and the second lead wire in order to reduce an influence by first lead wire 121 and the second lead wire. FIG. 17 is a view illustrating an example of touch panel device 100 in which the ground wires are formed. As illustrated in FIG. 17, first ground wires 181 are formed along first lead wires 121. Second ground wires 182 are formed along second lead wires 122. First ground wires 181 and second ground wires 182 are not limited to the shape illustrated in FIG. 17 as long as they are formed along first lead wires 121 and second lead wires 122, respectively. For example, first ground wires 181 may be formed to sandwich first lead wire 121. Further, first ground wires 181 may be formed in a mesh shape made from conductive wires. Likewise, second ground wires 182 may be formed to sandwich second lead wire 122. Further, second ground wire 182 may be formed in a mesh shape made from conductive wires.

When first ground wire 181 is formed as illustrated in FIG. 17, the capacitance of outermost second electrode YPj (second electrode YP5 in this example) increases, which causes a difference between a time constant of outermost second electrode YPj and a time constant of inner second electrode YPi. Hence, a shape of outermost second electrode YPj may be determined such that the time constant of outermost second electrode YPj is made equal to the time constant of inner second electrode YPi. For example, the mesh density of second reinforcing conductive wires 127 may be determined such that the time constant of outermost second electrode YPj is made equal to the time constant of inner second electrode YPi. In addition, the width in second extension wire 170 may be determined such that the time constant of outermost second electrode YPj is made equal to the time constant of inner second electrode YPi. Specifically, the mesh density of second reinforcing conductive wires 127 may increase in order to reduce the resistance value in outermost second electrode YPj. Moreover, the width in second reinforcing conductive wire 127 may be made larger than the width in second conductive wire 117 in order to reduce the resistance value of outermost second electrode YPj. In addition, the width in second extension wire 170 may be made larger than the width in second conductive wire 117 in order to reduce the resistance value of outermost second electrode YPj.

Likewise, when second ground wire 182 is formed as illustrated in FIG. 17, a capacitance of outermost first electrode XPj (first electrode XP5 in this example) increases, which causes a difference between a time constant of outermost first electrode XPj and a time constant of inner first electrode XPi. Hence, a shape of outermost first electrode XPj may be determined such that the time constant of outermost first electrode XPj is made equal to the time constant of inner first electrode XPi. For example, the mesh density of first reinforcing conductive wires 126 may be determined such that the time constant of outermost first electrode XPj is made equal to the time constant of inner first electrode XPi. In addition, the width in first extension wire 160 may be determined such that the time constant of outermost first electrode XPj is made equal to the time constant of inner first electrode XPi. Specifically, the mesh density of first reinforcing conductive wires 126 may increase in order to reduce the resistance value of outermost first electrode XPj. Moreover, the width in first reinforcing conductive wire 126 may be made larger than the width in first conductive wire 116 in order to reduce the resistance value of outermost first electrode XPj. In addition, the width in first extension wire 160 may be made larger than the width in first conductive wire 116 in order to reduce the resistance value of outermost first electrode XPj.

Figure 18:
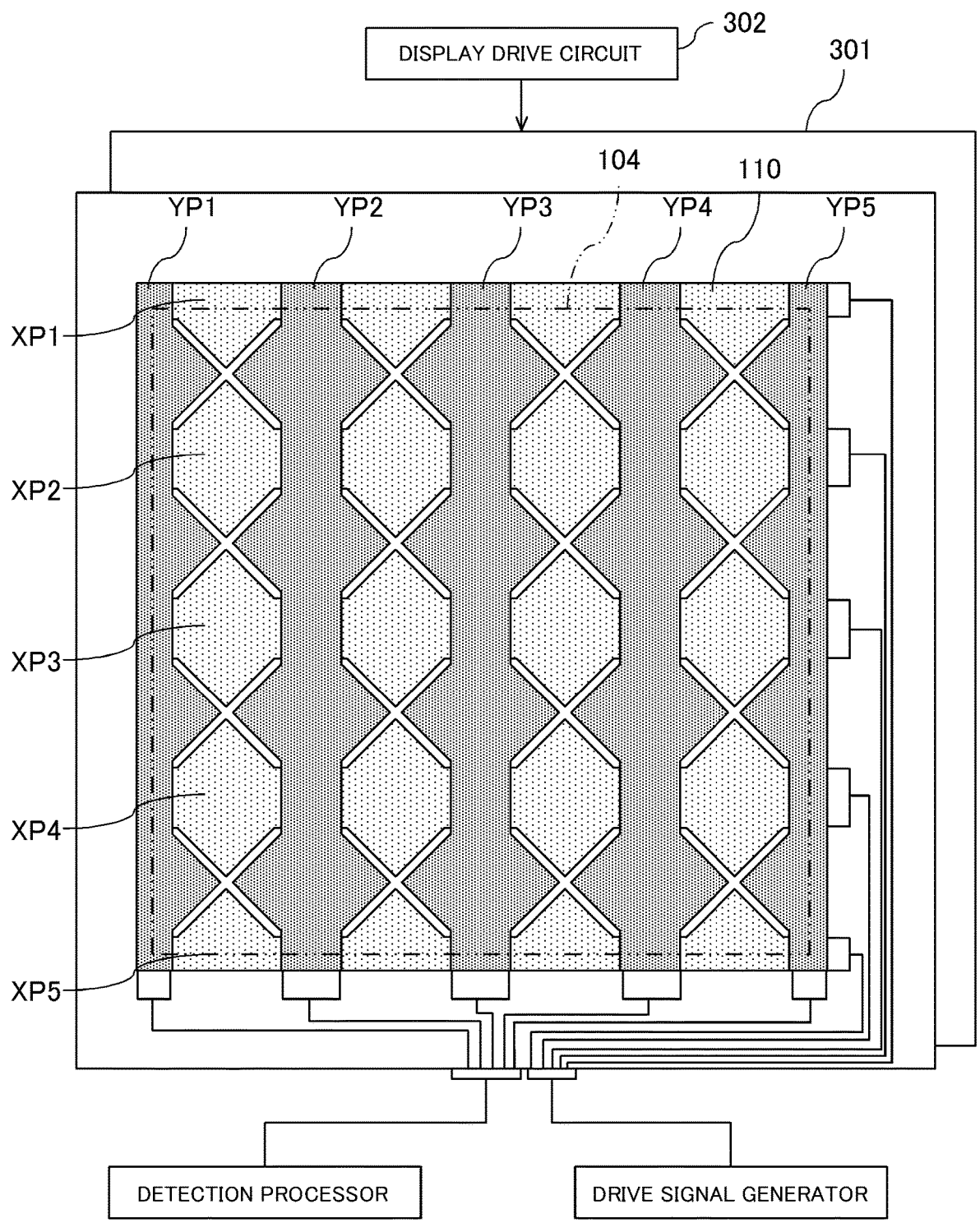
FIG. 18 is a view illustrating an overall configuration of a display device including the touch panel according to the present exemplary embodiment.

Further, it is possible to realize a display device having a touch detection function by applying touch panel 101 according to the present invention to a display device such as a liquid crystal display device or an organic EL display device. FIG. 18 is a view illustrating an overall configuration of display device 300 having touch panel 101 according to the present exemplary embodiment. As illustrated in FIG. 18, display device 300 includes touch panel 101, drive signal generator 102, detection processor 103, frame 104 that covers the periphery edge of touch panel 101 and display panel 301, display panel 301 that displays an image, display drive circuit 302 that drives display panel 301, and a backlight device (not illustrated). Touch panel 101, drive signal generator 102, and detection processor 103 are the same as those illustrated in FIGS. 1 and 2; therefore, the description thereof will be omitted. Display panel 301 includes a counter substrate (not illustrated), a TFT substrate (not illustrated), and a liquid crystal layer (not illustrated) held between the substrates, and is placed so as to be superimposed on touch panel 101. Display drive circuit 302 includes, for example, a gate line drive circuit (not illustrated) and a data line drive circuit (not illustrated). Here, a part of outermost first electrode XPj included in touch panel 101 and a part of outermost second electrode YPj are exposed to touch region 130 from frame 104. Touch panel 101 may be a so-called external type touch panel to be attached to a display surface of display panel 301, or may be a so-called on-cell type touch panel in which touch panel 101 is provided between a glass substrate and a polarizing plate of display panel 301.

While there have been described what are at present considered to be certain embodiments of the application, it will be understood that various modifications may be made thereto, and it is intended that the appended claims cover all such modifications as fall within the true spirit and scope of the invention.

What is claimed is:

1. A touch panel comprising:
   a plurality of first electrodes that extend in a first direction and are arrayed in a second direction intersecting the first direction;
   a plurality of second electrodes that extend in the second direction and are arrayed in the first direction; and
   an insulating film disposed between the plurality of first electrodes and the plurality of second electrodes,
   wherein each of the plurality of first electrodes and each of the plurality of the second electrodes are constructed with a plurality of conductive wires, the plurality of conductive wires having mesh shape,
   each of the plurality of first electrodes is formed having a plurality of wide portions and a plurality of narrow portions, each of the plurality of narrow portions of the plurality of first electrodes has a width that is a length in the second direction narrower than each of the plurality of wide portions, which are alternately arranged in the first direction,
   one wide portion from the plurality of wide portions and one narrow portion from the plurality of narrow portions in an endmost first electrode formed at an end among the plurality of first electrodes are narrower than one wide portion from the plurality of wide portions and one narrow portion from the plurality of narrow portions in an inner first electrode located inside the endmost first electrode, respectively, each of the plurality of second electrodes is formed having a plurality of wide portions and a plurality of narrow portions, each of the plurality of narrow portions of the plurality of second electrodes has a width that is a length in the first direction narrower than each of the plurality of wide portions, which are alternately arranged in the second direction, and one wide portion of the plurality of wide portions and one narrow portion of the plurality of narrow portions in an endmost second electrode formed at an end among the plurality of second electrodes are narrower than one wide portion of the plurality of wide portions and one narrow portion of the plurality of narrow portions in an inner second electrode located inside the endmost second electrode, respectively.

2. The touch panel according to claim 1, wherein
the endmost first electrode constitutes a first electrode located at both ends in the second direction among the plurality of first electrodes,
the endmost second electrode constitutes a second electrode located at both ends in the first direction among the plurality of second electrodes,
an end outline in the second direction of the endmost first electrode is formed in a straight line in the first direction, and
an end outline in the first direction of the endmost second electrode is formed in a straight line in the second direction.

3. The touch panel according to claim 1, wherein an external shape of a sensor region constructed with the plurality of first electrodes and the plurality of second electrodes is formed into a rectangular shape in plan view of the touch panel.

4. The touch panel according to claim 1, wherein
the endmost first electrode is formed into a shape in which the wide portion and the narrow portion of the inner first electrode are cut in the first direction, and
the endmost second electrode is formed into a shape in which the wide portion and the narrow portion of the inner second electrode are cut in the second direction.

5. The touch panel according to claim 1, wherein
a width in the endmost first electrode is larger than a half of a width in the inner first electrode, and
a width in the endmost second electrode is larger than a half of a width in the inner second electrode.

6. The touch panel according to claim 1, wherein
mesh density of a part of the endmost first electrode is larger than mesh density of the inner first electrode, and
mesh density of a part of the endmost second electrode is larger than mesh density of the inner second electrode.

7. The touch panel according to claim 6, wherein
a first reinforcing conductive wire is formed in a part of the endmost first electrode,
a second reinforcing conductive wire is formed in a part of the endmost second electrode, and
the first reinforcing conductive wire, the second reinforcing conductive wire, the plurality of conductive wires of the endmost first electrode, and the plurality of conductive wires of the endmost second electrode are formed so as to intersect with one another in plan view.

8. The touch panel according to claim 6, wherein
the mesh density of the part of the endmost first electrode is determined such that time constants of the endmost first electrode and the inner first electrode become equal to each other, and
the mesh density of the part of the endmost second electrode is determined such that time constants of the endmost second electrode and the inner second electrode become equal to each other.

9. The touch panel according to claim 1, wherein
a first extension wire that is conductive with the endmost first electrode is formed outside the endmost first electrode, and
a second extension wire that is conductive with the endmost second electrode is formed outside the endmost second electrode.

10. The touch panel according to claim 9, wherein
a width in the first extension wire is determined such that time constants of the endmost first electrode and the inner first electrode become equal to each other, and
a width in the second extension wire is determined such that time constants of the endmost second electrode and the inner second electrode become equal to each other.

11. The touch panel according to claim 1, wherein a dummy electrode that is not conductive with the first electrode and the second electrode is formed between two adjacent first electrodes from the plurality of first electrodes and between two adjacent second electrodes from the plurality of second electrodes.

12. The touch panel according to claim 1, wherein
lead wires are electrically connected to each of the plurality of first electrodes and each of the plurality of second electrodes, and
a ground wire is formed along the lead wires.

13. A display device comprising:
the touch panel according to claim 1; and
a display panel that displays an image.

14. The display device according to claim 13, further comprising a frame that covers peripheries of the touch panel and the display panel, and
wherein a part of the endmost first electrode is exposed from the frame.

* * * * *